US005214534A

United States Patent [19]

Kallman et al.

[11] Patent Number: 5,214,534

[45] Date of Patent: May 25, 1993

[54] CODING INTENSITY IMAGES AS PHASE-ONLY IMAGES FOR USE IN AN OPTICAL CORRELATOR

[75] Inventors: Robert R. Kallman, Denton, Tex.; Dennis H. Goldstein, Niceville, Fla.

[73] Assignee: The United States of America as represented by the Secretary of the Air Force, Washington, D.C.

[21] Appl. No.: 717,588

[22] Filed: Jun. 19, 1991

[51] Int. Cl.[5] ........................ G02B 27/40; G06E 3/00

[52] U.S. Cl. .................................... 359/561; 364/822

[58] Field of Search ........................ 359/560, 561, 559; 364/822

[56] References Cited

U.S. PATENT DOCUMENTS

| | | | |
|---|---|---|---|
| 4,588,260 | 5/1986 | Horner | 359/561 X |
| 4,765,714 | 8/1988 | Horner et al. | 359/561 |
| 4,826,285 | 5/1989 | Horner | 359/561 |
| 5,024,508 | 6/1991 | Horner | 359/561 |

OTHER PUBLICATIONS

Horner, J. L. and Leger, J. R. "Pattern Recognition with Binary Phase-Only Filters" *Applied Optics*, vol. 24, No. 5, Mar. 1, 1985 pp. 609-611.

Horner, J. L. and Gianino, P. D. "Phase-Only Matched Filtering" *Applied Optics*, vol. 23, No. 6, Mar. 15, 1984, pp. 812-816.

*Primary Examiner*—Bruce Y. Arnold
*Assistant Examiner*—David R. Parsons
*Attorney, Agent, or Firm*—Robert L. Nathans; Donald J. Singer

[57] ABSTRACT

A method of performing image correlation in a Fourier transform correlator utilizes phase-encoding of the input image as a phase object with a normalized amplitude component. Phase-only reference image filters are used in conjunction with the phase-encoded input objects to improve the signal to clutter ratio. This technique can employ optical or digital implementation.

11 Claims, 1 Drawing Sheet

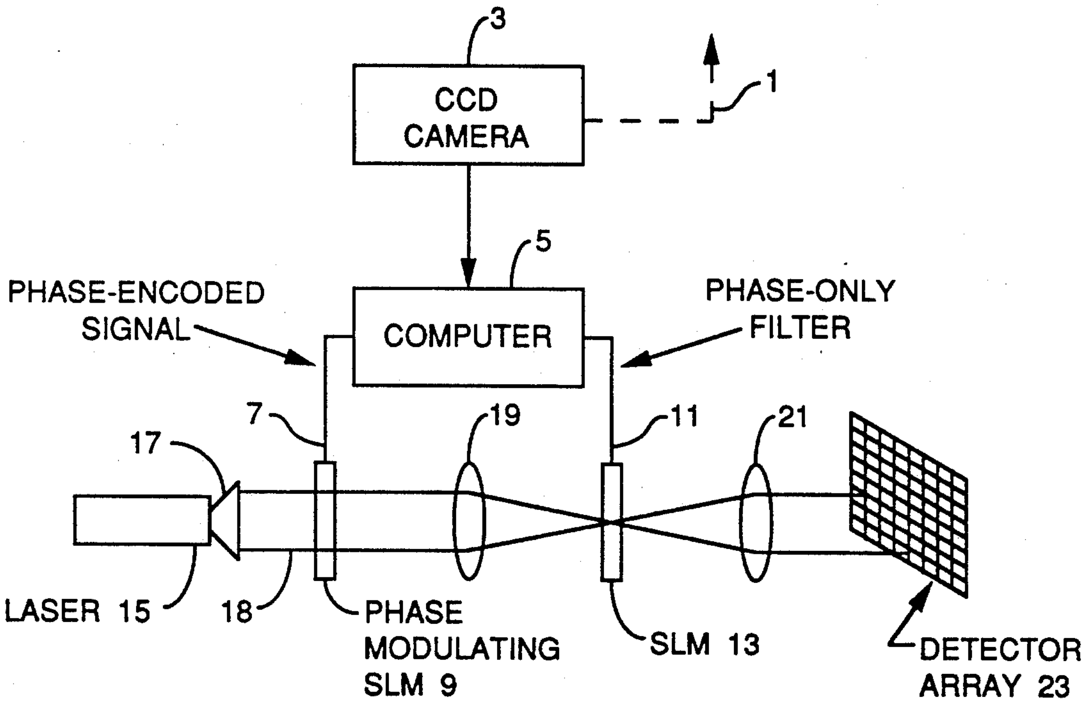
3
CCD
CAMERA
1
5
PHASE-ENCODED
SIGNAL
COMPUTER
PHASE-ONLY
FILTER
7
19
11
21
17
LASER 15
18
PHASE
MODULATING
SLM 9
SLM 13
DETECTOR
ARRAY 23

CODING INTENSITY IMAGES AS PHASE-ONLY IMAGES FOR USE IN AN OPTICAL CORRELATOR

STATEMENT OF GOVERNMENT INTEREST

The invention described herein may be manufactured and used by or for the Government for governmental purposes without the payment of any royalty thereon.

BACKGROUND OF THE INVENTION

The present invention relates to the field of Fourier transform optical correlators used for image recognition.

Optical image correlation has been applied as a pattern recognition technique for some time. See for example, A. Vander Lugt, IEEE Trans. Inf. Theory II-10, 139(1964). Although many optical correlation systems use film or etched chrome on glass plates as spatial filters, more recent implementations have used spatial light modulators (SLMs). The introduction of SLMs have made possible adaptive correlator systems which can process hundreds or even thousands of filters per second under real-time control of the system operator. At the same time, it has been shown that the most important part of the filtering operation is that done on the phase of the Fourier transform because of the large amount of image information carried with the phase. See J. L. Horner and P. D. Gianino, Appl. Opt. 23, 812 (1984).

The combination of phase-only filtering and the use of SLMs as spatial filters carries an attendant problem of phase distortion in the input image and in the filter, since ideal phase-only filtering assumes a pure intensity image with no phase distortion and a pure phase filter with no phase distortion; since the optical system uses coherent light, phase as well as amplitude must be considered at every point in the system. Previous researchers have presented methods of eliminating, or taking advantage of, the phase distortions present in the light modulators serving as the input image or the filter device. See U.S. Pat. No. 4,826,285 (1989) issued to J. L. Horner; and R. D. Juday, S. E. Monroe Jr., and D. A. Gregory, Proc. SPIE 826, 149(1987).

BRIEF SUMMARY OF THE INVENTION

An input image to be identified is introduced into an optical correlator and is encoded as a pure phase-only, normalized amplitude signal. The Fourier transform of this image is taken and multiplied by a two dimensional phase-only reference image filter. The inverse Fourier transform of the product results in correlation of the input image to the correlator with the reference image. The process may be implemented on a digital computer or in an optical system. Experimental results from the computer implementation indicate a large improvement in the signal-to-clutter ratio over the more conventional methods using intensity-encoded images and phase-only filters.

Other objects, features and advantages will become apparent upon study of the following description, taken in conjunction with the sole FIGURE illustrating an embodiment of the invention.

SPECIFIC DESCRIPTION OF PREFERRED EMBODIMENTS OF THE INVENTION

Suppose a detector array registers an intensity image $(a^2_{pq})$ $(a_{pq} \geqq 0, 1 \leqq p,q \leqq N)$ on its active pixels, where N is the number of pixels along the side of two dimensional array. In standard optical correlator architecture and related algorithm, the amplitude image apq is then used as the correlator input. There is no mathematical reason why this should be so. Thus, it could well be advantageous to input some other image $b_{pq}$ which is a function of $a^2_{pq}$, so long as there is a one-to-one correspondence $(a_{pq}^2) \rightarrow (b_{pq})$ between the detected image and the phase-encoded wavefront produced by the first spatial light modulator. For a function $\phi$, the rule $(a_{pq}^2) \rightarrow (\phi(a_{pq}^2))$ can be one-to-one in general only if $\phi$ is one-to-one, at least on the set of possible measured intensities $(\phi a^2_{pq})$. It has been shown for imagery that amplitudes in the Fourier domain do not contain much information, but phases contain most of the information, as previously referenced. This suggests that the function $\phi$ should be chosen to be a complex exponential. Assume that an image has been digitized into eight bits (this could be any convenient number). Let $$b_{pg} = \phi(a^2_{pg}) = \exp\left(\frac{a^2_{pg}\pi i}{255}\right).$$

Here $a^2_{pq}$ is divided by 255 and then multiplied by $\pi$ so that $a^2_{pq}\pi/255$ ranges between 0 and $\pi$. We do this so that the mapping $a^2_{pq} \rightarrow \phi(a^2_{pq})$ is one-to-one and so that $\phi(0)$ and $\phi$ (255) are as far apart as possible. Then $\phi(a^2_{ij})$ will always be a complex number of modulus one lying in the first and second quadrants of the complex plane.

Optical implementation of the phase-only encoded input image calls for a phase-modulating spatial light modulator (SLM). There are several devices described in the literature which can be used to input to an optical correlator an arbitrary array of phases lying in the first or second quadrant of the complex plane, such as liquid crystal SLMs. The liquid crystal light valve manufactured by Hughes (see "Phase-only Modulation with Twisted Nematic Liquid Crystal Spatial Light Modulators", Optics Letters, 13, 251 (1988), and any of the various liquid crystal television screens, (see "Phase-Only Modulation Using a Twisted Nematic Liquid Crystal Television", Appl. Opt.,28, 4845 (1989) are potentially suitable candidates. Perhaps the most promising device for this purpose is the flexure beam version of the deformable mirror device manufactured by Texas Instruments; see "Deformable-Mirror Spatial Light Modulators", Proc. SPIE 1150(1989). This device is capable of sixteen-state pure phase control. The active area of the device is composed of small reflective elements which are hinged so as to provide a piston-like action. The movement of the elements are controlled electrically, and the position of an element will determine the change of the phase of the wavefront over that element relative to all other elements.

Referring now to the optical embodiment of the invention shown in the sole FIGURE, an input image 1 to be correlated with stored reference filter image signals in computer 5, is detected by electronic CCD camera 3 to input an image signal into the correlator. The computer supplies a phase-only encoded signal to a first phase-modulating SLM 9 via lead 7, which signal is proportional to the intensity of the input image 1 detected by CCD camera 3. Laser 15 and beam expander 17 supplies a light beam 18 to the phase-modulating SLM 9 which has a constant intensity across the SLM, and the wavefront of the beam is flat, so that all pixels have the same phase upon entering SLM 9.

The phase-encoded signal inputted to the first SLM 9 is produced in computer 5 which has calculated the signals required to cause each element of the SLM to modulate the phase of the wavefront of beam 18 to the correct amount. That is, the phase front or wave front is modulated in phase in accordance with the prescription previously set forth hereinabove, where phase modulation at each point or pixel of the wavefront depends upon the the original intensity distribution of input image 1. Since relative amplitude of the beam 18 is not changed by the SLM, the input beam having an equal intensity will produce a first amplitude-normalized phase-only encoded optical signal which is a function of the intensity of the input image signal 1 as previously described. A first Fourier transform lens 19 produces the Fourier transform of the output of SLM 9 at the second phase-modulating SLM 13 which also is a phase-only SLM that receives the phase-only reference image filter from computer 5 via lead 11. SLM 13 along with a second Fourier transform lens 21, inverse Fourier transforms the product of the Fourier transform of the first phase-only optical signal produced by SLM 9 and the second phase-only encoded reference filter image signal inserted into SLM 13 by computer 5.

This reference filter image signal contains the pre-calculated phase-only filter of the reference image to be correlated with the input image 1 inputted into the correlator from the outside world. The computer 5 typically stores a library of reference image phase-only filters generated by the computer from a plurality of reference images. The correlation peak signal, if present, is detected by detector array 23 which could be a CCD camera. The aforesaid components 9, 19, 13 and 21 are preferrably separated from each other by one focal length of equal focal length Fourier transform lenses 19 and 21 as is well known. Other details of the correlator are well known in the art; see the aforesaid Horner patent.

It should be noted that although we are employing a phase-only SLM 9, we do not measure the phase of the signal 1 inputted into the correlator via the computer by camera 3; rather we phase encode the wavefront of light beam 18 as a function of the intensities of this input signal.

Results from an example digital correlation are shown in the table. Digitized images of an M-48 military tank were used as reference objects to create the filters and as input images for the correlation process. Images of any other object would have served as well. There were a total of 61 images of the tank. These images were taken by a video camera overlooking the vehicle and pointed twenty degrees down from the horizontal and were taken as the tank was rotated in one degree angular increments from −30 to +30 degrees about a frontal view of the tank.

The results to be expected from this process are independent of the specific geometry of the imagery, but this information is given for reference and as documentation for our experimental results.

The reference filters were derived as follows: take the Fourier transform of the tank image, take the Fourier transform of the false target, i.e. the background without the tank which in this case is uniform with an intensity equal to the average of the tank intensity, take the difference between these two transforms, save the remaining phase information and quantize into sixteen states. The result, with normalized amplitudes, is the filter. If there is more than one target in the training set, take the Fourier transforms of all of the tank images, average these, and perform the remaining steps set forth above.

The signal-to-clutter ratio (SCR) in the table is defined as SCR=T/N where T is the threshold and N is the clutter. As a single filter is correlated with the images it is designed to recognize (i.e. the set of images that was used to create the filter), various correlation peak values will result. The threshold is defined to be the minimum of these peak values. The clutter is the largest signal outside any correlation peak from the complete set of correlations.

The following table shows a factor of from ten to sixteen improvement in SCR for the phase-encoded input of the present invention relative to the aforesaid prior art approach, for sixteen-state phase filters. This technique may be implemented optically or by a digital computer. It may also be implemented with SLMs operating in the reflective mode, rather than in the transmissive mode as shown in the figure. The technique may be applied to one or two-dimensional images from any image forming optical, laser or radar system.

TABLE 1

| | SCR for 16-State Phase-only Filters | |
|---|---|---|
| No. of images | SCR Phase-only Filter | SCR Phase-only Filter with Phase-encoded image |
| 1 | 4 | 40 |
| 61 | .25 | 4 |

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. A method of improving the signal-to-clutter ratio in a Fourier transform correlator comprising the steps of:

(a) inputting an input image signal into said Fourier transform correlator;

(b) phase-encoding said input image signal into a first phase-only encoded signal;

(c) providing a second phase-only encoded reference filter image signal;

(d) producing the Fourier transform of the first phase-only encoded signal; and (e) inverse Fourier transforming the product of the Fourier transform of the first phase-only encoded signal and the second phase-only encoded reference filter image signal to obtain a correlation signal.

2. A method of improving the signal-to-clutter ratio in a Fourier transform correlator comprising the steps of:

(a) inputting an input image signal into said correlator;

(b) producing a first amplitude-normalized phase-encoded signal which is a function of said input image signal;

(c) providing a second amplitude-normalized phase-encoded reference filter image signal which is a function of a reference image signal;

(d) producing the Fourier transform of the first phase-encoded signal; and (e) inverse Fourier transforming the product of the Fourier transform of the first amplitude-normalized phase-encoded signal and the second amplitude-normalized phase-encoded reference filter image signal to obtain a correlation signal.

3. The method of claim 2 wherein the phase-encoding of step (b) is such that the intensity I of each pixel of said input image signal is divided by M and then multiplied by $\pi$, where M is an integer such that $I\pi/M$ ranges between 0 and $\pi$ radians.

4. The method of claim 3 where M equals 255.

5. A method of improving the signal-to-clutter ratio in a Fourier transform correlator comprising the steps of:

(a) inputting an input image signal into said Fourier transform correlator;

(b) producing a first amplitude-normalized phase-only encoded signal which is a function of the intensity of said input image signal;

(c) providing a second amplitude-normalized phase-only encoded reference filter image signal which is a function of a reference image signal;

(d) producing the Fourier transform of the first phase-only encoded signal; and (e) inverse Fourier transforming the product of the Fourier transform of the first amplitude-normalized phase-only encoded signal and the second phase-only encoded reference filter image signal to obtain a correlation signal.

6. The method of claim 5 wherein the intensity I of each pixel of said input image signal is divided by M and then multiplied by $\pi$ during the performance of step (b), where M is an integer such that $I\pi/M$ ranges between 0 and $\pi$ radians.

7. A method of improving the signal-to-clutter ratio in a Fourier transform correlator comprising the steps of:

(a) providing a first and second phase-modulating spatial light modulator;

(b) inputting an input image signal into said correlator;

(c) producing a first phase-only encoded signal which is proportional to the intensity of the input image signal;

(d) applying said first phase-only encoded signal to said first phase-modulating spatial light modulator;

(e) applying a second phase-only encoded reference filter image signal to said second phase-modulating spatial light modulator;

(f) producing the Fourier transform of the first phase-only encoded signal in said first phase-modulating spatial light modulator at the second phase-modulating spatial light modulator; and (g) inverse Fourier transforming the product of the Fourier transform of the first phase-only encoded signal in said first spatial light modulator and the second phase-only encoded reference filter image signal in said second spatial light modulator to obtain a correlation signal.

8. The method of claim 7 wherein the intensity I of each pixel of said input image signal is divided by M and then multiplied by $\pi$ during the performance of step (c), where M is an integer such that $I\pi/M$ ranges between 0 and $\pi$ radians.

9. The method of claim 8 where M equals 255.

10. A method of improving the signal-to-clutter ratio in a Fourier transform correlator comprising the steps of:

(a) providing a first and second phase-modulating spatial light modulator;

(b) inputting a phase-only encoded input image signal into said first phase-modulating spatial light modulator;

(c) reading out a phase-only encoded optical signal from said first phase-modulating spatial light modulator;

(d) inserting a phase-only encoded reference filter image signal into said second phase-modulating spatial light modulator;

(e) producing the Fourier transform of the first phase-only encoded optical signal produced by the first phase-modulating spatial light modulator at the second phase-modulating spatial light modulator; and (f) inverse Fourier transforming the product of the fourier transform of the first phase-only encoded optical signal and the phase-only encoded reference filter image signal in the second phase-modulating spatial light modulator to obtain a correlation signal.

11. The method of claim 10 wherein step (c) includes illuminating said first phase-modulating spatial light modulator with collimated coherent light to produce said phase-only encoded optical signal.

* * * * *